US012735250B2

(12) United States Patent
Wang

(10) Patent No.: US 12,735,250 B2
(45) Date of Patent: Sep. 15, 2026

(54) PEDAL TYPE FLIP-UP TRASH CAN

(71) Applicant: ZHEJIANG SHUANGYI HOUSEWARE CO., LTD., Zhejiang (CN)

(72) Inventor: Qiongying Wang, Zhejiang (CN)

(73) Assignee: ZHEJIANG SHUANGYI HOUSEWARE CO., LTD., Zhejiang (CN)

( * ) Notice: Subject to any disclaimer, the term of this patent is extended or adjusted under 35 U.S.C. 154(b) by 0 days.

(21) Appl. No.: 19/023,146

(22) Filed: Jan. 15, 2025

(65) Prior Publication Data

US 2026/0001715 A1 Jan. 1, 2026

(30) Foreign Application Priority Data

Jun. 28, 2024 (CN) ......................... 202421524564.0

(51) Int. Cl.
*B65F 1/16* (2006.01)
*B65F 1/08* (2006.01)

(52) U.S. Cl.
CPC ................ *B65F 1/163* (2013.01); *B65F 1/08* (2013.01); *B65F 1/1615* (2013.01); *B65F 1/1646* (2013.01); *B65F 2210/148* (2013.01)

(58) Field of Classification Search
CPC ... Y10S 220/908; B65D 43/26; B65D 43/262; B65F 1/163; B65F 2001/1661; B65F 1/08; B65F 1/06; B65F 1/1646; B65F 1/062; B65F 1/1615; B65F 1/1607; B65F 2001/1669; B65F 1/1623
USPC ....... 16/354; 220/263, 264, 908, 262, 908.1, 220/827, 260
See application file for complete search history.

(56) References Cited

U.S. PATENT DOCUMENTS

| | | | | |
|---|---|---|---|---|
| 5,082,132 | A * | 1/1992 | Tsai | B65F 1/0066 220/264 |
| 8,393,489 | B1 * | 3/2013 | Stravitz | B65F 1/163 220/264 |
| 10,723,549 | B2 * | 7/2020 | Yang | B65F 1/163 |
| 2018/0305120 | A1 * | 10/2018 | Yang | B65F 1/163 |

FOREIGN PATENT DOCUMENTS

| | | |
|---|---|---|
| CN | 215708998 | 2/2022 |

* cited by examiner

*Primary Examiner* — King M Chu
(74) *Attorney, Agent, or Firm* — Zhigang Ma

(57) ABSTRACT

A pedal type flip-up trash can includes a body assembly having an opening; a lid on left and right sides of the opening, wherein a hinge point between the lid and the body assembly is located in a middle rear part of the lid; and a transmission assembly for controlling the opening. The transmission assembly includes a pedal hinged at the bottom of the body assembly; a first rod, movably arranged in a first movable groove at the pedal; a second rod, connected to the first rod through a movable portion, and the first rod is movably arranged in a second movable groove on the movable portion; a block provided with gear teeth and arranged at the second rod; and a gear rotatably arranged in the body assembly, with the side being clamped with the lid, and a clamping point between the gear and the lid is the hinge point.

8 Claims, 9 Drawing Sheets

PEDAL TYPE FLIP-UP TRASH CAN

CROSS-REFERENCE TO RELATED APPLICATION

This application claims the priority benefit of China application serial no. 202421524564.0, filed on Jun. 28, 2024. The entirety of the above-mentioned patent application is hereby incorporated by reference herein and made a part of this specification.

BACKGROUND

Technical Field

The present technical solution relates to the technical field of trash cans, in particular to a pedal type flip-up trash can.

Description of Related Art

Trash can, also known as waste bin or garbage can, refers to a container for holding garbage. It is mostly made of metal or plastic. A plastic bag is put in it for using. When there is too much garbage, the bag can be tied up and thrown away. Trash can is the container for "hiding dirt and dust" in people's lives. Most trash cans have lids to prevent the peculiar smell of garbage from spreading, and the lid of some trash cans can be opened through a pedal. Most household trash cans are provided in the kitchen to store kitchen waste. Some families will put one in each main room.

Chinese patent CN215708998U discloses a pedal type bag-breaking trash can, in which a stainless steel pedal is arranged at the front end of the trash can, and the stainless steel pedal is connected to the lid arranged at the rear end of the trash can through a pedal shaft seat, a shaft bracket and a rear lid shaft. The lid of the trash can can be opened by pressing down the stainless steel pedal. However, this trash can has the following disadvantages when in use:

1. Since its transmission mode is such that the pedal shaft seat, shaft bracket and rear lid shaft cooperate with each other to directly support the lid of the trash can to open, the pedal shaft seat, shaft bracket and rear lid shaft will be deformed and aged due to compression after long-time use of the trash can, and the lid of the trash can will not be opened in place.
2. To maintain the lid of the trash can open, the stainless steel pedal needs to be pressed down continuously. When a person needs to throw away garbage multiple times, he can only repeatedly open the trash can or press down the stainless steel pedal for a long time, which is inconvenient for him to operate.

SUMMARY

The present technical solution is to provide a pedal type flip-up trash can. By arranging the hinge points of the lid and the body assembly on the left and right side walls of the opening, the transmission assembly controls the side edge of the lid to rotate for opening, thereby solving the problems of deformation and quick aging for the components after the lid which is directly supported by the original pedal is opened by the original pedal through the transmission assembly. The purpose of the present technical solution is so achieved that:

A pedal type flip-up trash can, comprises: a body assembly having an opening at the upper end; a lid hinged on the inner wall on the left and right sides of the opening, wherein the hinge point between the said lid and the said body assembly is located in the middle rear part of the lid; and a transmission assembly for controlling the opening of the lid. Among them, the transmission assembly comprises: a pedal, which is hinged at the bottom of the body assembly; a transmission rod I, whose front end is movably arranged in a movable groove I provided at the rear end of the pedal; a transmission rod II, whose lower end is connected to the rear end of the transmission rod I through a movable portion, and the rear end of the said transmission rod I is movably arranged in a movable groove II provided on the movable portion; a transmission block, which is provided with a plurality of transmission gear teeth and is arranged at the upper end of the transmission rod II; and a transmission gear, which is rotatably arranged in the body assembly, with the side being clamped with one side of the said lid, and the said clamping point between the said transmission gear and the lid is also the hinge point between the lid and the body assembly.

Preferably, the said movable groove I and the movable groove II are both configured as waist-shaped grooves.

Preferably, the trash can also comprises a locking member, which is rotatably arranged on the said body assembly and is located beside the hinge point between the said lid and the body assembly; and when the lid is opened, the locking member is rotated to resist against the lid, so as to achieving long-time opening of the lid.

Preferably, a protrusion is provided at the lower end of the said locking member, and a locking hole is provided in the said body assembly; and when the lid is closed, the said protrusion is located in the locking hole.

Preferably, the rear end for the side edge of the lid is point A, and the midpoint for the side edge of the lid is point B; and the hinge point of the said lid and the body assembly is located in the vertical area between point A and point B.

Preferably, the distance between point A and point B is divided into three equal parts to form point C and point D, the point C is closer to point A, and the point D is closer to point B; and the hinge point of the lid and body assembly is located in the vertical area between point C and point D.

Preferably, the rear end of the said body assembly is recessed inwardly to form an avoidance portion, the rear end of the said lid is provided with an edge in a protruding manner, and the edge is movably provided in the avoidance portion to movably abut against the opening.

Preferably, the said transmission assembly further comprises a return spring, which is arranged in a mounting groove provided in the transmission block and is used to make the said transmission rod II always have a downward movement tendency.

Preferably, a clamping block is provided in a protruding manner on the side of the said lid, and a clamping groove is provided on the side wall of the said transmission gear; and when the said lid is connected to the transmission gear, the said clamping block is clamped in the clamping groove.

Preferably, the said body assembly comprises: a base, on which a limiting cover plate is provided, and the limiting cover plate cooperates with the base to form a mounting position I located in the middle of the base and a mounting position II located on the rear end side of the base; an inner barrel and an outer barrel, both of which are provided on the said limiting cover plate, and a mounting position III is formed on the left side between the inner barrel and the outer barrel; and a top seat, whose cover is provided on the inner barrel and the outer barrel, a limiting member is provided inside, and the said limiting member cooperates with the top seat to form a mounting position IV located on the left side of the top seat. Among them, the said pedal is provided in the mounting position I, the front end of the said transmission rod I passes through the mounting position II to connect to the pedal, and the rear end passes through the mounting position II to connect to the movable portion; the said transmission rod II is provided in the mounting position III; and the said transmission gear and the transmission block are provided in the mounting position IV.

Compared with the prior art, the present technical solution has the following outstanding and beneficial technical effects that:

1. The lid designed in the present technical solution is hinged on the left and right side walls of the opening, the transmission assembly realizes the opening of the lid by controlling the rotation of one end for the lid, and the pedal is located at the front end of the body assembly. The provision of the transmission assembly can prevent the pedal from directly propping up the lid to open, and the hinge point of the lid is located at the rear part thereof. When the lid is flipped open, it only needs to overcome the weight of the front end part for the lid hinge point, and the weight of the rear end part for the hinge point will help the lid to open. By changing the hinge point of the lid, the lid becomes a labor-saving lever when it is opened, so that the pressure of the lid on the transmission assembly is reduced, thereby prolonging the service life of the trash can.
2. The lid opening method designed in the technical solution is semi-buried. When it is opened, part of the lid is located in the inner barrel, which reduces the space height required when the lid is opened, making the trash can more convenient to use.
3. The locking member designed in the technical solution is rotated by manual toggling. When the lid is opened, the locking member can be manually toggled to prevent the lid from falling, thereby achieving long-time opening of the lid.

DESCRIPTION OF THE EMBODIMENTS

The embodiment of the present technical solution will be further described below with reference to the drawings.

Figure 1:
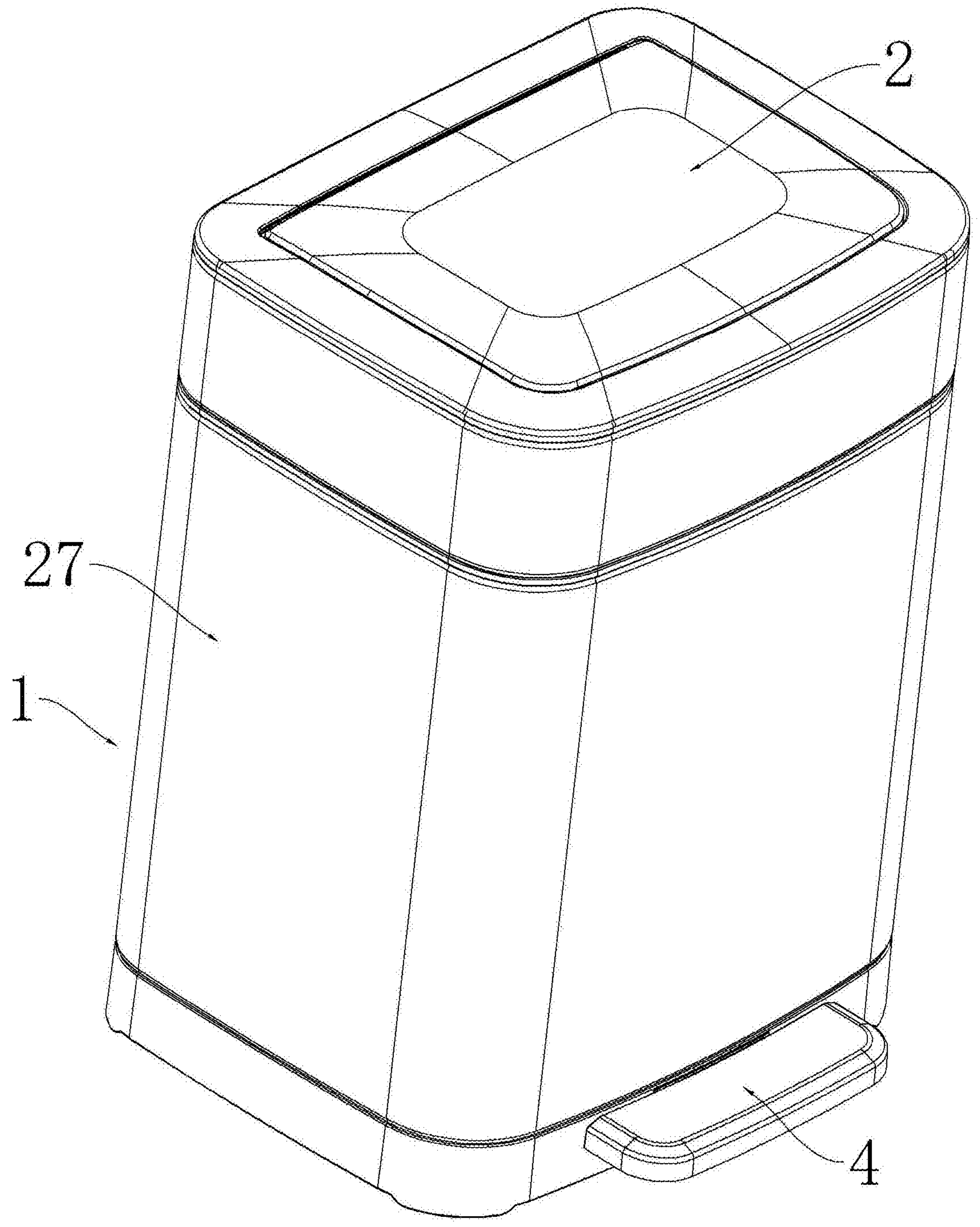
FIG. 1 is a schematic diagram for the external structure of the present technical solution.
Figure 2:
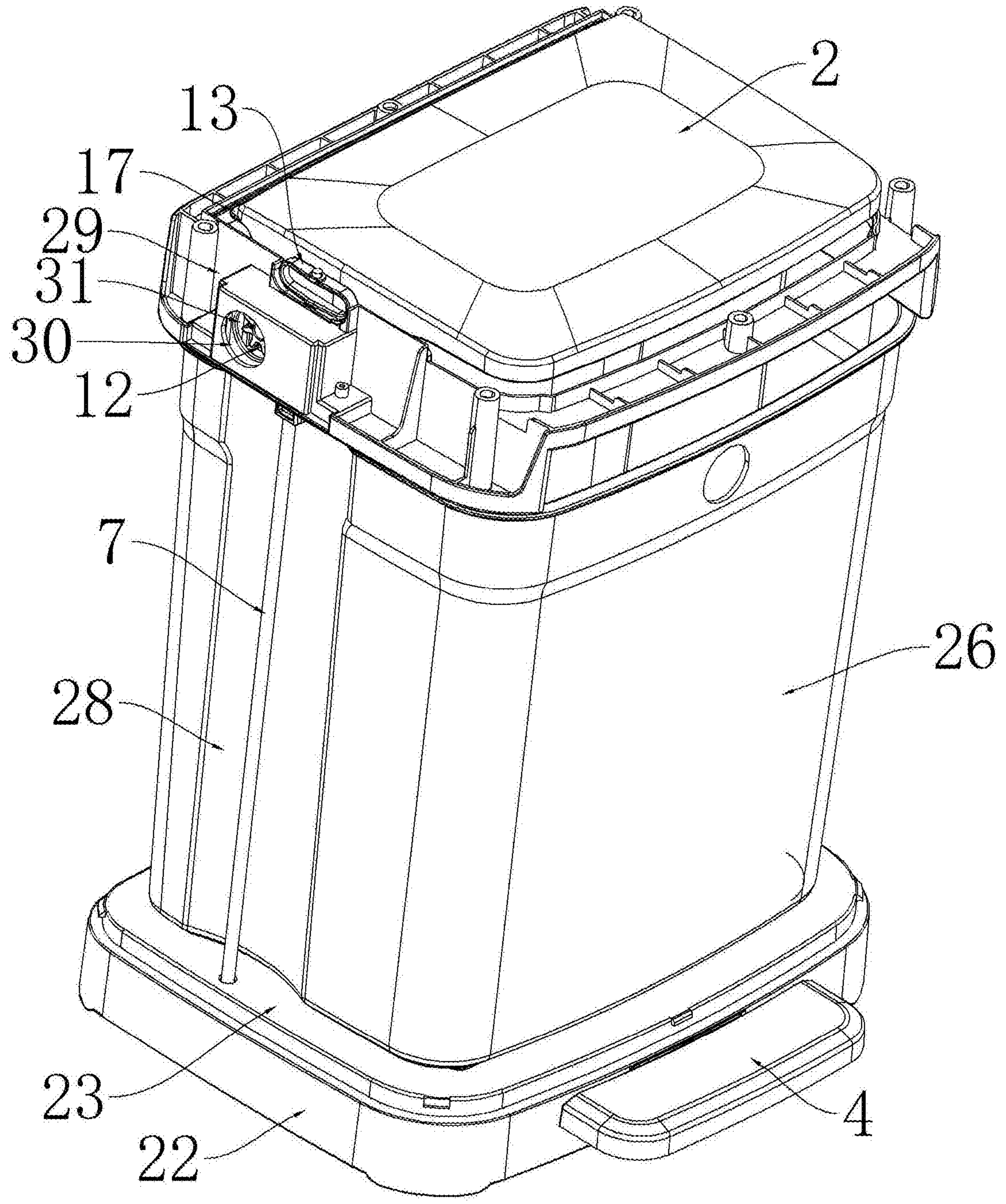
FIG. 2 is schematic diagram I for the internal structure of the present technical solution.
Figure 3:
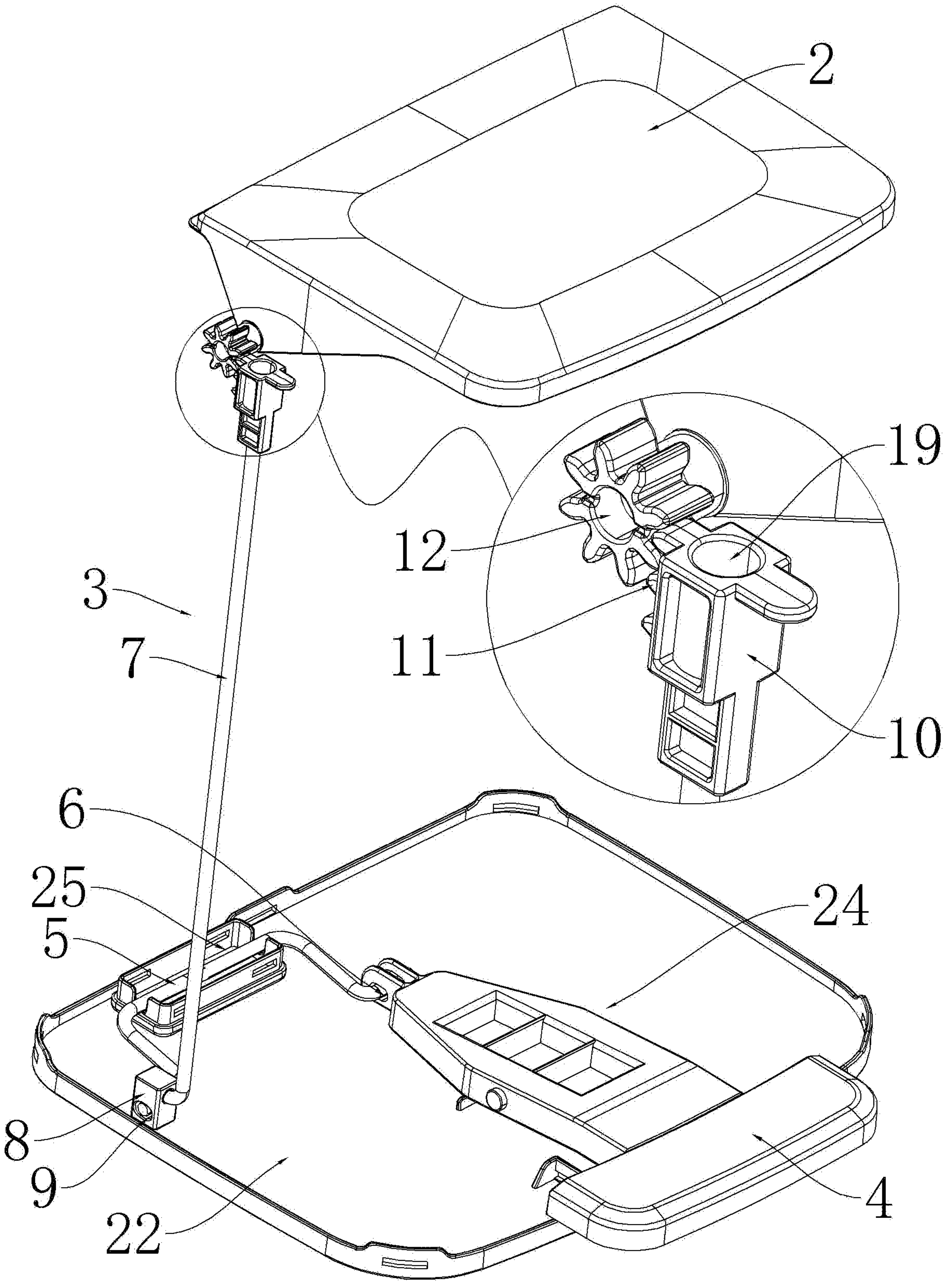
FIG. 3 is schematic diagram II for the internal structure of the present technical solution.
Figure 4:
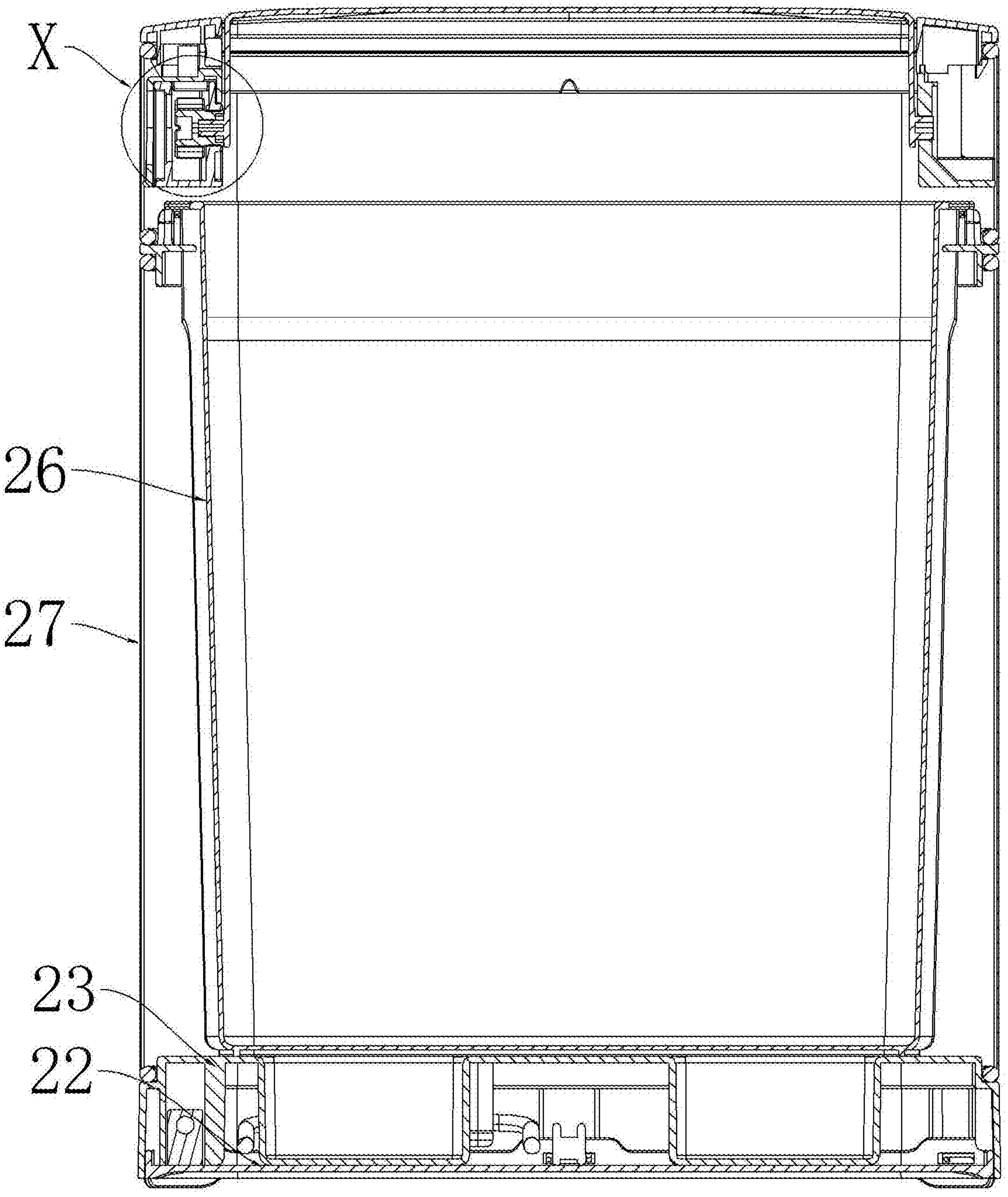
FIG. 4 is sectional view I of the present technical solution.
Figure 5:
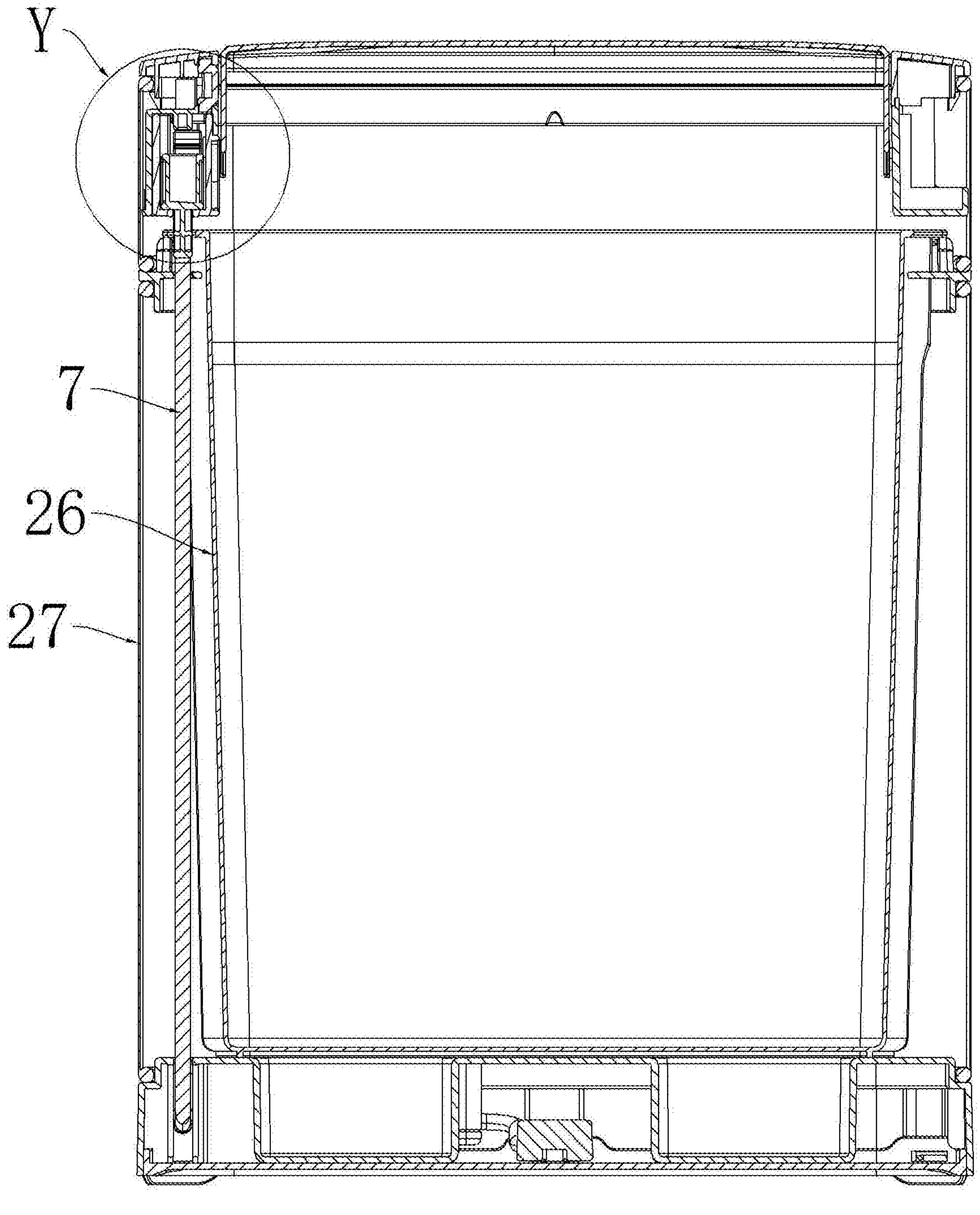
FIG. 5 is sectional view II of the present technical solution.
Figure 6:
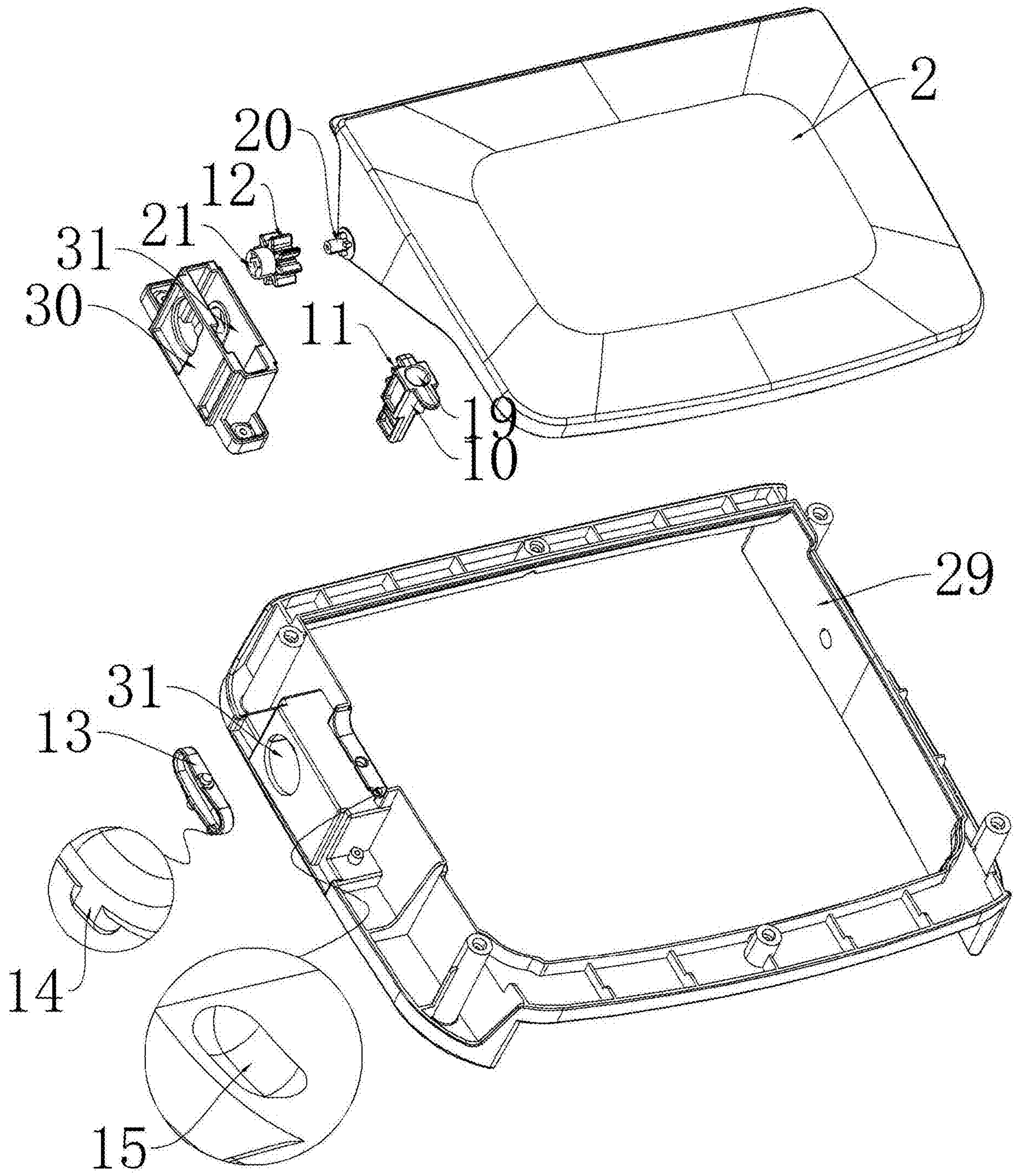
FIG. 6 is a schematic diagram for the structure of the transmission assembly cooperating with the lid.
Figure 7:
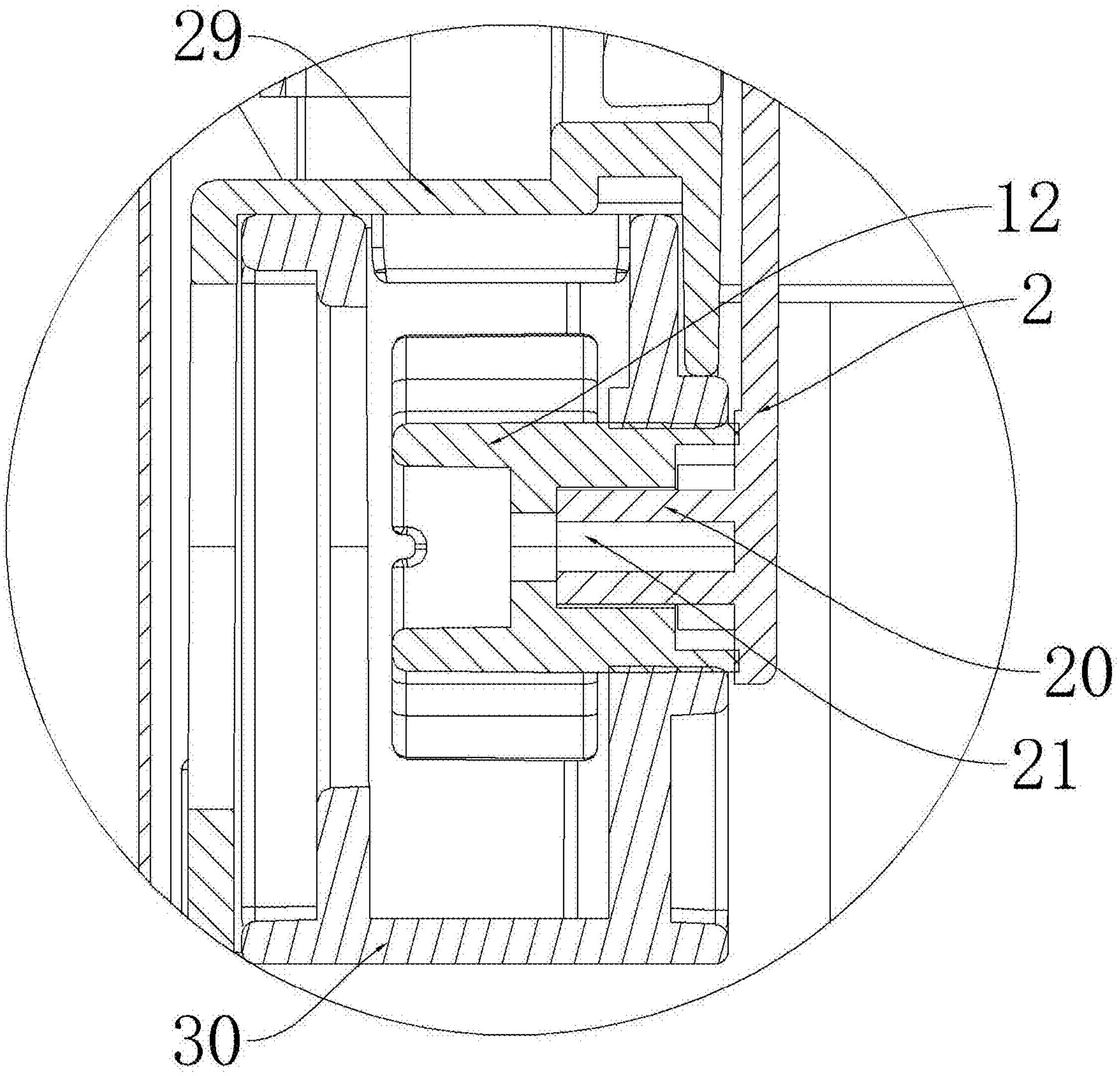
FIG. 7 is an enlarged view of FIG. 4 at point X.
Figure 8:
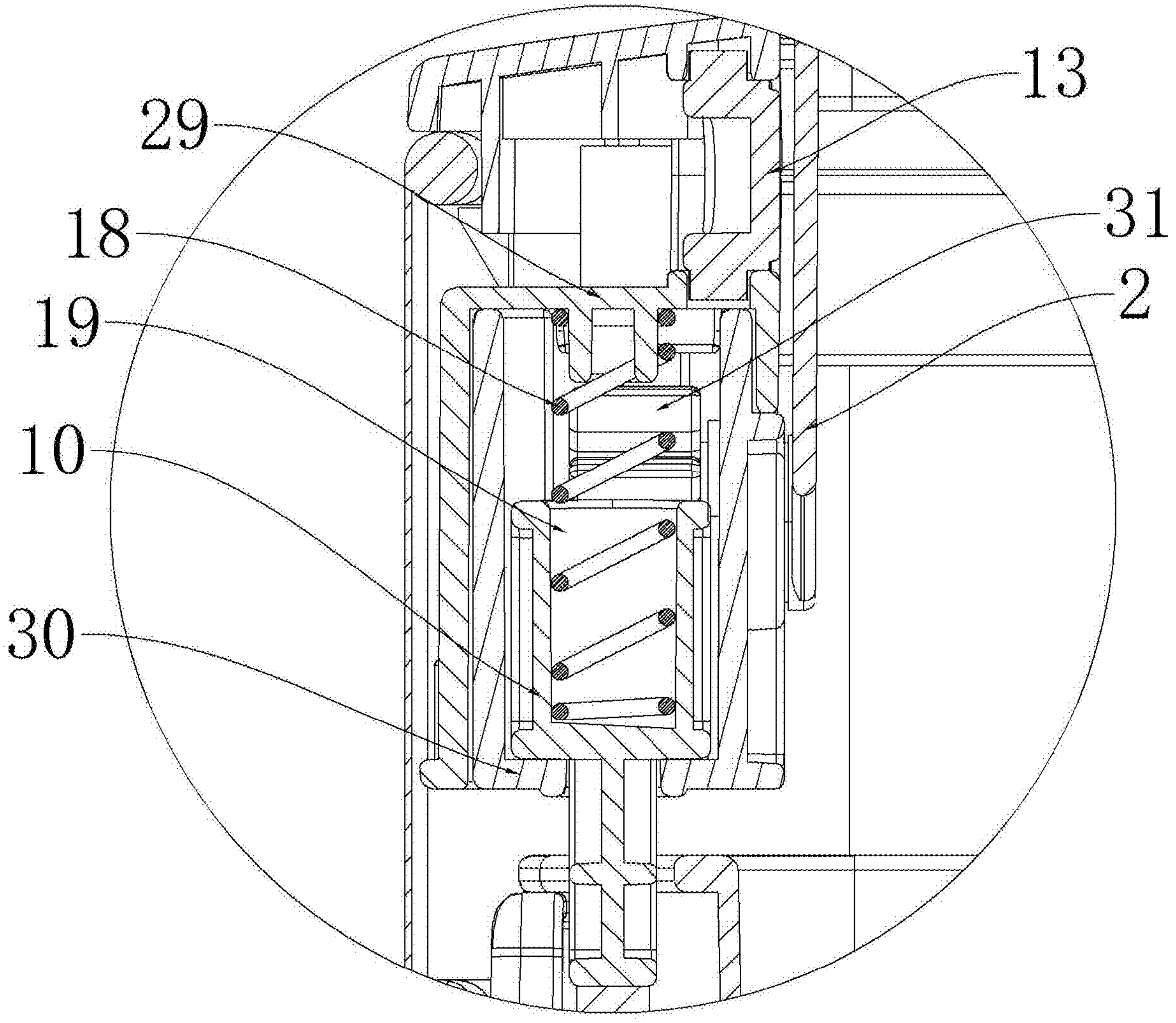
FIG. 8 is an enlarged view of FIG. 5 at point Y.

As shown in FIGS. 1 to 3, a pedal type flip-up trash can, comprises a body assembly 1, a lid 2 and a transmission assembly 3. The present application mainly improves the control method for opening the lid 2, and the connection structure between the transmission assembly 3 and the lid 2. The lid 2 is hinged on the left and right inner walls for the opening of the body assembly 1, and the lid 2 is opened by rotating the side edge of the lid 2.

Figure 9:
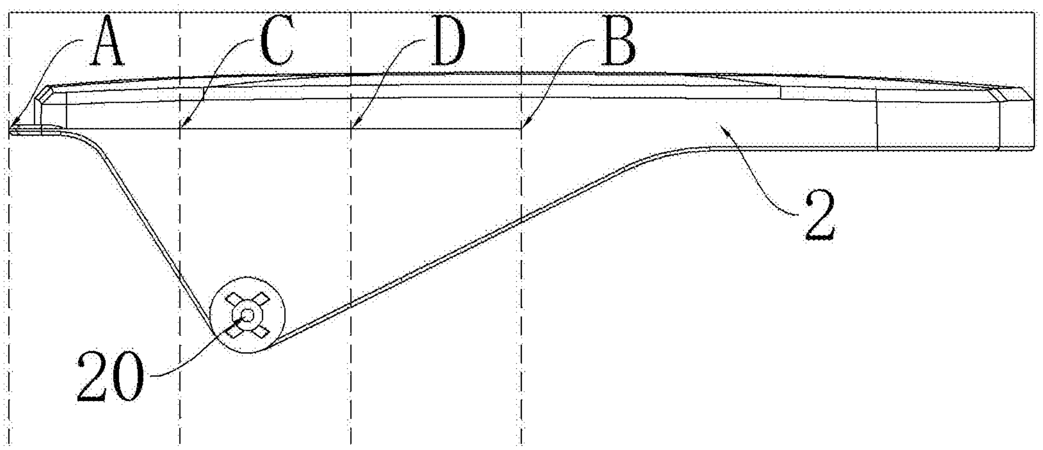
FIG. 9 is a schematic diagram showing the position of the hinge point on the lid.

Specifically, the hinge point of the lid 2 and the body assembly 1 is located in the middle rear part of the lid 2, as shown in FIG. 9, the rear end for the side edge of the lid 2 is point A, and the midpoint for the side edge of the lid 2 is point B; and the hinge point of the lid 2 and the body assembly 1 is located in the vertical area between point A and point B.

Further, the distance between point A and point B is divided into three equal parts to form point C and point D, the point C is closer to point A, and the point D is closer to point B; and the hinge point of the lid 2 and body assembly 1 is located in the vertical area between point C and point D.

Since the hinge point is below the lid 2 and close to the middle rear part of the lid 2, when the lid 2 is opened, its rear end will touch the body assembly 1. Therefore, the rear end of the body assembly 1 is recessed inwards to form an avoidance portion 16. The provision of the avoidance portion 16 can ensure the smooth opening of the lid 2. In addition, the lid 2 is provided with an edge 17 at the protrusion of the rear end. The edge 17 is movably arranged in the avoidance portion 16 and movably abuts against the opening. The edge 17 can ensure that the front end of the lid 2 during closing will not fall excessively.

Meanwhile, since the hinge point is provided in the middle rear part of the lid 2, the opening method of the lid 2 is semi-buried. When it is opened, part of the lid 2 is located in the body assembly 1, which reduces the space height required when the lid 2 is opened, making the trash can more convenient to use.

As shown in FIGS. 2 and 3, the body assembly 1 comprises a plurality of constituent parts, which cooperate with each other to form mounting positions, and the remaining components of the trash can are provided in the mounting positions. The mounting positions can be used to realize the positioning and fixing of the remaining components. The body assembly 1 comprises: a base 22, on which a limiting cover plate 23 is provided, and the limiting cover plate 23 cooperates with the base 22 to form a mounting position I 24 located in the middle of the base 22 and a mounting position II 25 located on the rear end side of the base 22; an inner barrel 26 and an outer barrel 27, both of which are provided on the said limiting cover plate 23, and a mounting position III 28 is formed on the left side between the inner barrel 26 and the outer barrel 27; and a top seat 29, whose cover is provided on the inner barrel 26 and the outer barrel 27, a limiting member 30 is provided inside, and the limiting member 30 cooperates with the top seat 29 to form a mounting position IV 31 located on the left side of the top seat 29.

As shown in FIGS. 2 to 8, the transmission assembly 3 comprises: a pedal 4, a transmission rod I 5, a transmission rod II 7, a transmission lock 10 and a transmission gear 12. The pedal 4 is hinged at the bottom of the body assembly 1 and is positioned in the mounting position I 24 to provide drive force for opening the lid 2; the front end of the transmission rod I is movably arranged in the movable groove I 6 provided at the rear end of the pedal 4, the rear end is movably arranged in the movable groove II 9 provided in the movable portion 8, and the transmission rod I is provided in the mounting position II to be used for transmitting the up and down movement of the pedal 4 in the middle at the bottom of the body assembly 1 to the edge side at the bottom of the body assembly 1; the lower end of the transmission rod II 7 is connected to the rear end of the transmission rod I 5 through the movable portion 8, and the transmission rod II is provided in the mounting position III 28 to transmit the up and down movement of the transmission rod I 5 at the rear end to the transmission block 10; the transmission block 10 is provided with a plurality of transmission gear teeth 11 and is arranged at the upper end of the transmission rod II 7, and the transmission block is provided in the mounting position IV 31 to drive the transmission gear 12 to rotate; and the transmission gear is rotatably arranged in the body assembly 1, with the side being clamped with one side of the lid 2, the transmission gear is provided in the mounting position IV 31 to control the opening of the lid 2, and the clamping point between the transmission gear 12 and the lid 2 is also the hinge point between the lid 2 and the body assembly 1.

Further, a clamping block 20 is provided on the side of the lid 2 in a protruding manner, and a clamping groove 21 is provided on the side wall of the transmission gear 12; and when the lid 2 is connected to the transmission gear 12, the clamping block 20 is clamped in the clamping groove 21, and the clamping block 20 and the clamping groove 21 realize the fixed connection between the transmission gear 12 and the flip.

Further, the movable groove I 6 and the movable groove II 9 are configured as waist-shaped grooves, which provide compensation space for the front and rear ends of the transmission rod I 5 during movement. Since the transmission rod 15 moves in the body assembly 1 by rotating around the middle position of the transmission rod I 5, the movement trajectories of the front and rear ends are arc-shaped, and the groove width of the waist-shaped groove is larger than the inner diameter of the front and rear ends for the transmission rod I 5. Therefore, the front and rear ends of the transmission rod I 5 can be movably provided in the movable groove I 6 and the movable groove II 9 respectively.

As shown in FIGS. 4 to 8, the trash can also comprises a locking member 13, the locking member 13 is clamped under the lid 2 near the hinge point by rotating itself to prevent the lid 2 from closing. The locking member 13 is provided on the top seat 29, a rotating portion is provided on the locking member 13, and the rotating portion is movably provided in the rotating groove provided on the top seat 29; and when the lid 2 is opened, the locking member 13 is rotated to make it under the lid 2 to realize long-time opening of the lid 2.

Further, a protrusion 14 is provided at the lower end of the locking member 13, and a locking hole 15 is provided on the top seat 29; and when the lid 2 is closed, the protrusion 14 is located in the locking hole 15, which can ensure that the locking member 13 will not shake at will.

As shown in FIGS. 4 to 8, the transmission assembly 3 also comprises a reset spring 18, and the reset spring 18 is provided in a mounting groove 19 provided in the transmission block 10. The upper end of the reset spring 18 abuts against the top seat 29, and the lower end is provided at the bottom of the mounting groove 19. When the transmission block 10 moves upwards, the reset spring 18 is compressed, and the reset spring 18 makes the transmission portion always have a downward movement trend to help the lid 2 to reset.

It should be noted that the structure, proportion, size, etc. plotted in the drawings of this specification are only used to match the contents disclosed in the specification. They are used for people familiar with this technology to understand and read, and are not used to restrict the limitations for the implementation of the present utility model, so they have no substantial technical significance. Any modifications of the structure, changes in the proportional relationship, or adjustments of the size, without affecting the effects and purposes that can be achieved by the present utility model, should still fall within the scope of the technical content disclosed by the present technical solution. At the same time, the terms such as “upper”, “lower”, “left”, “right”, “middle” and “a” quoted in this specification are only for the convenience of description, and are not used to limit the implementation scope of the present utility model. The change or adjustment of their relationship without substantially changing the technical content should also be considered to fall within the implementation scope of the present utility model.

It should also be noted that, when an element is referred to as being “fixed on” or “provided on” another element, it may be directly located on the other element or there may be an intermediate element at the same time. When an element is referred to as being “connected with” another element, it may be directly connected with the other element or may be indirectly connected with another element through an intermediate element.

In addition, the descriptions of “first”, “second”, etc. in the present application are only used for descriptive purposes and cannot be understood as indicating or implying their relative importance or implicitly indicating the number of the indicated technical features. Therefore, the features defined as “first” and “second” may explicitly or implicitly include at least one of the features. Furthermore, the technical solutions of the various embodiment can be combined with each other, but they must be based on the fact that the ordinary technicians in this field can implement them. When the combination of technical solutions is contradictory or cannot be implemented, it should be deemed that such combination of technical solutions does not exist and is not within the scope of protection required by the present application.

The above shows and describes the basic principles, main features and advantages of the present technical solution. It should be understood by those skilled in the industry that the present technical solution is not limited to the above embodiment. The description in the above embodiment and specification are only used for explaining the principles of the present technical solution. Without departing from the spirit and scope of the present technical solution, the present technical solution may have various variations and improvements, which fall within the protection scope of the present technical solution. The required protection scope of the present technical solution is defined by the attached claims and their equivalents.

What is claimed is:

1. A pedal type flip-up trash can, comprising:

a body assembly having an opening at an upper end;

a lid hinged on an inner wall on left and right sides of the opening, wherein a hinge point between the lid and the body assembly is located in a middle rear part of the lid; and a transmission assembly for controlling opening of the lid, wherein, the transmission assembly comprises:

a pedal, which is hinged at a bottom of the body assembly;

a first transmission rod, whose front end is movably arranged in a first movable groove provided at a rear end of the pedal;

a second transmission rod, whose lower end is connected to a rear end of the first transmission rod through a movable portion, and the rear end of the first transmission rod is movably arranged in a second movable groove provided on the movable portion;

a transmission block, which is provided with a plurality of transmission gear teeth and is arranged at an upper end of the second transmission rod; and a transmission gear, which is rotatably arranged in the body assembly, with a side being clamped with one side of the lid, and a clamping point between the transmission gear and the lid is the hinge point between the lid and the body assembly, wherein the trash can further comprises a locking member, which is rotatably arranged on the body assembly and is located beside the hinge point between the lid and the body assembly, when the lid is opened, the locking member is rotated to resist against the lid, so as to achieve long-time opening of the lid, a protrusion is provided at a lower end of the locking member, and a locking hole is provided in the body assembly, and when the lid is closed, the protrusion is located in the locking hole.

2. The pedal type flip-up trash can according to claim 1, wherein the first movable groove and the second movable groove are both configured as waist-shaped grooves, each of the waist-shaped grooves include a narrowed middle portion and enlarged end portions to provide compensation space for the front and rear ends of the first transmission rod.

3. The pedal type flip-up trash can according to claim 1, wherein a rear end for a side edge of the lid is a point A, and a midpoint for the side edge of the lid is a point B; and the hinge point of the lid and the body assembly is located in a vertical area between the point A and the point B.

4. The pedal type flip-up trash can according to claim 3, wherein a distance between a point A and a point B is divided into three equal parts to form a point C and a point D, the point C is closer to the point A, and the point D is closer to the point B; and the hinge point of the lid and the body assembly is located in a vertical area between the point C and the point D.

5. The pedal type flip-up trash can according to claim 4, wherein a rear end of the body assembly is recessed inwardly to form an avoidance portion, a rear end of the lid is provided with an edge in a protruding manner, and the edge is movably provided in the avoidance portion to movably abut against the opening.

6. The pedal type flip-up trash can according to claim 5, wherein the transmission assembly further comprises a return spring, which is arranged in a mounting groove provided in the transmission block and is used to make the second transmission rod always have a downward movement tendency.

7. The pedal type flip-up trash can according to claim 6, wherein a clamping block is provided in a protruding manner on a side of the lid, and a clamping groove is provided on a side wall of the transmission gear; and when the lid is connected to the transmission gear, the clamping block is clamped in the clamping groove.

8. The pedal type flip-up trash can according to claim 7, wherein the body assembly comprises:

a base, on which a limiting cover plate is provided, and the limiting cover plate cooperates with the base to form a first mounting position located in a middle of the base and a second mounting position located on a rear end side of the base;

an inner barrel and an outer barrel, both of which are provided on the limiting cover plate, and a third mounting position is formed on a left side between the inner barrel and the outer barrel; and a top seat, whose cover is provided on the inner barrel and the outer barrel, a limiting member is provided inside, and the limiting member cooperates with the top seat to form a fourth mounting position located on a left side of the top seat, wherein, the pedal is provided in the first mounting position, the front end of the first transmission rod passes through the second mounting position to connect to the pedal, and the rear end of the first transmission rod passes through the second mounting position to connect to the movable portion; the second transmission rod is provided in the third mounting position; and the transmission gear and the transmission block are provided in the fourth mounting position.

* * * * *